US009201682B2

United States Patent
Cheng et al.

(10) Patent No.: US 9,201,682 B2
(45) Date of Patent: Dec. 1, 2015

(54) VIRTUALIZED DEVICE RESET

(71) Applicant: ATI Technologies ULC, Markham (CA)

(72) Inventors: Gongxian Jeffrey Cheng, Toronto (CA); Anthony Asaro, Toronto (CA); Yinan Jiang, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 344 days.

(21) Appl. No.: 13/923,513

(22) Filed: Jun. 21, 2013

(65) Prior Publication Data

US 2014/0380028 A1 Dec. 25, 2014

(51) Int. Cl.
| | |
|---|---|
| *G06F 11/00* | (2006.01) |
| *G06F 9/00* | (2006.01) |
| *G06F 9/455* | (2006.01) |
| *G06F 1/24* | (2006.01) |
| *G06F 11/14* | (2006.01) |

(52) U.S. Cl.
CPC ............. *G06F 9/45558* (2013.01); *G06F 1/24* (2013.01); *G06F 9/45533* (2013.01); *G06F 11/1441* (2013.01); *G06F 2009/4557* (2013.01); *G06F 2009/45575* (2013.01); *G06F 2009/45591* (2013.01)

(58) Field of Classification Search
CPC ............ G06F 9/45558; G06F 9/45533; G06F 9/45566; G06F 9/45541; G06F 9/45545; G06F 9/4555; G06F 2009/45575; G06F 2009/4557; G06F 2009/45562; G06F 2009/45591; G06F 1/24; G06F 11/1441
See application file for complete search history.

(56) References Cited

U.S. PATENT DOCUMENTS

| | | | | |
|---|---|---|---|---|
| 5,805,790 | A * | 9/1998 | Nota et al. | 714/10 |
| 6,961,941 | B1 * | 11/2005 | Nelson et al. | 719/319 |
| 7,813,366 | B2 * | 10/2010 | Freimuth et al. | 370/419 |
| 8,522,253 | B1 * | 8/2013 | Rozas et al. | 718/108 |
| 2009/0183180 | A1 * | 7/2009 | Nelson | 719/319 |
| 2012/0192178 | A1 * | 7/2012 | Brownlow et al. | 718/1 |
| 2012/0246641 | A1 * | 9/2012 | Gehrmann | 718/1 |
| 2013/0198743 | A1 * | 8/2013 | Kruglick | 718/1 |

* cited by examiner

*Primary Examiner* — Bryce Bonzo
*Assistant Examiner* — Anthony J Amoroso
(74) *Attorney, Agent, or Firm* — Volpe and Koenig, P.C.

(57) ABSTRACT

In a hardware-based virtualization system, a hypervisor switches out of a first function into a second function. The first function is one of a physical function and a virtual function and the second function is one of a physical function and a virtual function. During the switching a malfunction of the first function is detected. The first function is reset without resetting the second function. The switching, detecting, and resetting operations are performed by a hypervisor of the hardware-based virtualization system. Embodiments further include a communication mechanism for the hypervisor to notify a driver of the function that was reset to enable the driver to restore the function without delay.

23 Claims, 6 Drawing Sheets

VIRTUALIZED DEVICE RESET

BACKGROUND

1. Field

The present disclosure is generally related to hardware-based virtual devices.

2. Background

A virtual machine (VM) is an isolated guest operating system (OS) installation within a host in a virtualized environment. A virtualized environment runs one or more VMs in the same system simultaneously or in a time-sliced fashion. Hardware-based virtualization allows for guest VMs to behave as if they are in a native environment, since guest OSs and VM drivers may have minimal awareness of their VM status.

Hardware-based virtualized environments can include physical functions (PFs) and virtual functions (VFs). PFs are full-featured express functions that include configuration resources (for example, a PCI-Express function). Virtual functions (VFs) can be "lightweight" functions that generally lack configuration resources. In a virtual environment, there may be one VF per VM, and a VF may be assigned to a VM by a hypervisor. A hypervisor is a piece of computer software, firmware or hardware that creates and runs virtual machines. A computer on which a hypervisor is running one or more virtual machines is defined as a host machine. Each virtual machine is called a guest machine. The hypervisor provides the guest operating systems with a virtual operating platform and manages the execution of the guest operating systems. Multiple instances of a variety of operating systems may share the virtualized hardware resources.

Single root input/output virtualization (SR-IOV) functionality provides a standardized approach to the sharing of IO physical devices in a virtualized environment. SR-IOV functionality and standards have been addressed in the Single Root I/O Virtualization and Sharing Specification, Revision 1.0, Sep. 11, 2007, which is incorporated herein by reference. In particular, SR-IOV allows a single Peripheral Component Interconnect Express (PCIe) physical device under a single root port to appear as multiple separate physical devices to the hypervisor or the guest operating system. For example, the IO device can be configured by a hypervisor to appear in a peripheral component interconnect (PCI) configuration space as multiple functions, with each function having its own configuration space. SR-IOV uses PFs and VFs to manage global functions for the SR-IOV devices. PFs are full-featured PCIe Functions: they are discovered, managed, and manipulated in a similar manner as a standard PCIe device. As discussed previously, PFs have full configuration resource, which allows the PF to configure or control the PCIe device and also transfer data in and out of the device. VFs are similar to PFs but lack configuration resources. VFs generally have the ability to transfer data.

A SR-IOV interface is an extension to a peripheral component interconnect express (PCIe) specification. The SR-IOV interface allows a device, for example, a network adapter, to divide access to its resources among various PCIe functions. During operation, a device malfunction may be detected by a virtual function or a physical function, which requires a reset. However, existing application specific integrated circuit (ASIC) reset procedures do not allow reset of only a specific VF or PF without resetting the entire ASIC. Further, as each function in a virtualized system is allocated a small time slice, the device or the processor may end up in an uncertain state when existing ASIC reset procedures are used.

SUMMARY OF EMBODIMENTS

Embodiments provide for a virtualized device reset for SR-IOV devices.

Embodiments include methods, systems, and computer storage devices in a hardware-based virtualization system directed to resetting a function in a hardware-based virtualization system. In an embodiment, when switching between a first function and a second function, a malfunction of the, first function may be detected. The first function may be reset without resetting the second function or any additional functions in the hardware-based virtualization system. The functions may be physical or virtual. The switching, detecting, and resetting operations are performed by a hypervisor of the hardware-based virtualization system. Embodiments further include a communication mechanism for the hypervisor to notify a driver of the function that was reset to enable the driver to restore the function without delay.

Further features and advantages of the disclosure, as well as the structure and operation of various disclosed and contemplated embodiments, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate exemplary disclosed embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

Figure 1:
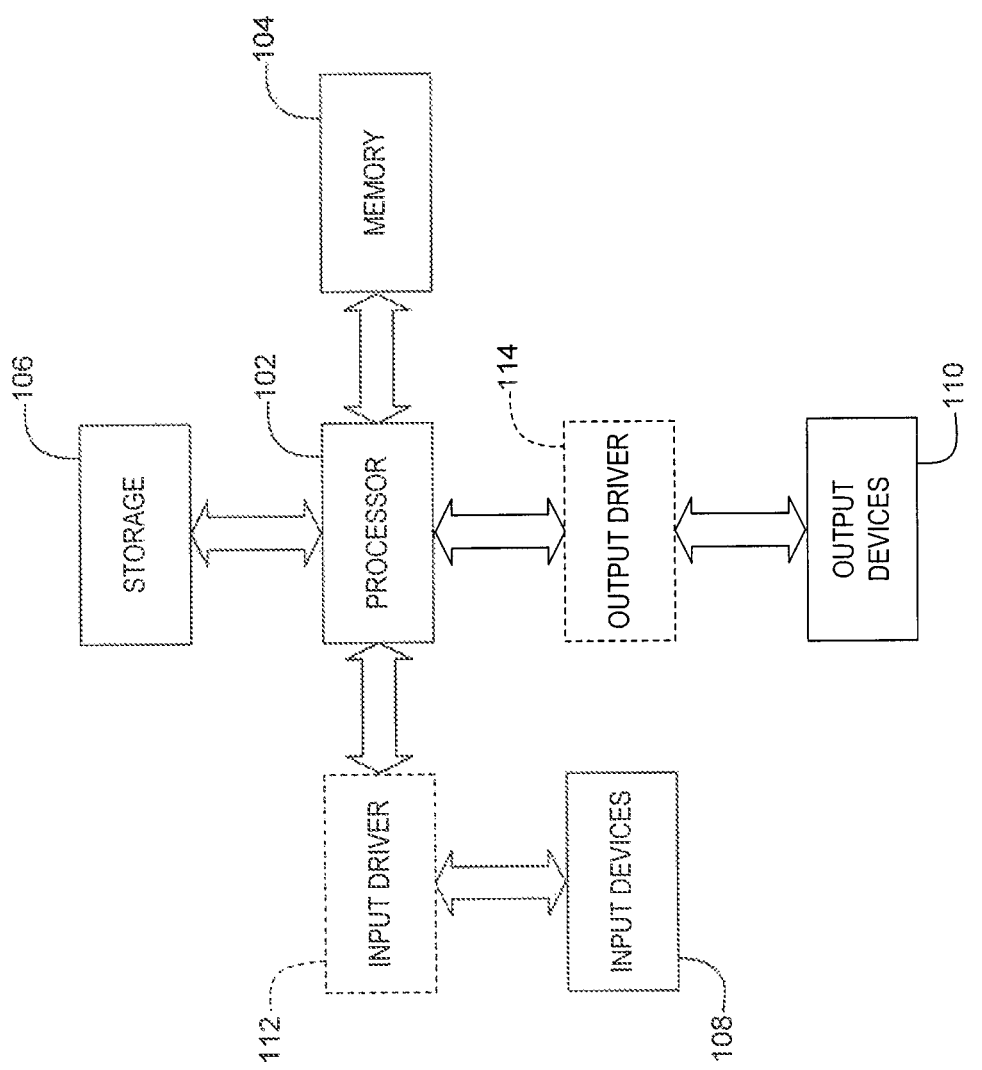
FIG. 1 is a block diagram illustrating, a computing system, in accordance with an embodiment.

The features and advantages of the disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the detailed description that follows, references to "one embodiment," "an embodiment," "an example embodiment,"

etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "embodiments" or "embodiments of the invention" do not require that all embodiments include the discussed feature, advantage or mode of operation. Alternate embodiments may be devised without departing from the scope of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a", "an" and "the" are, intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Any reference to modules in this specification and the claims means any combination of hardware and/or software components for performing the intended function. A module need not be a rigidly defined entity, such that several modules may overlap hardware and software components in functionality. For example, a module may refer to a single line of code within a procedure, the procedure itself being a separate module. One skilled in the relevant arts will understand that the functionality of modules may be defined in accordance with a number of stylistic or performance-optimizing techniques, for example.

An application specific integrated circuit (ASIC) is an integrated circuit (IC) customized for a particular use, rather than intended for general-purpose use An ASIC can be reset using a per engine reset, full chip reset, or a hot link reset. These existing ASIC reset mechanisms, however, may not provide the desired result for a virtual function or a physical function in a SR-IOV virtualized environment for a number of reasons.

A per engine reset (also called a soft reset or a light reset) is a mechanism used by a driver to trigger a reset of a processor, for example, a graphics processing unit (GPU) or a central processing unit (CPU). The per engine reset mechanism is generally triggered through one or more memory mapped Input/Output (MMIO) read/write registers. When a physical function of a graphics driver issues a per engine reset, for example, by writing to a reset register, the driver instance may be interrupted if a global switch (or a world switch) occurs during the per engine reset. This may result in the processor ending up in an uncertain state. Additionally, the per engine reset may also affect read/write operations of the system. For example, a write operation may, be dropped or a read operation may return a value of zero.

A full chip reset is another mechanism used to reset a processor or a device. A full chip reset can be triggered by a driver of a physical function. However, if the driver of the physical function triggers a full chip reset, all functions (physical functions and virtual functions) will be reset without a hypervisor and, a guest OS being aware of the reset. This may crash the processor as the hypervisor loses track of the status of each function and guest OS.

A hot link reset uses a standard PCIe specification reset. A hot link reset can be triggered by configuring a register, for example, bit six in a PCI bridge control register. However, triggering a reset through a hot link reset in a physical function can crash the hypervisor due to the loss of the tracking of status, as discussed previously. Further, since the PCI configuration space for each PCI bridge in a virtual function is simulated by the hypervisor, any write operations to the PCI configuration space of a simulated bridge may not cause any action to a physical bridge.

There is a need for improved and efficient reset mechanisms in a virtualized environment.

Although, the invention is explained, for example, in the context of the SR-IOV specification, the disclosure is applicable to other specifications/protocols, for example, ARM, MIPS, etc.

FIG. 1 is a block diagram, of an example system 100 in which one or more disclosed embodiments may be implemented. System 100 can be, for example, a general purpose computer, a gaming console, a handheld computing device, a set-top box, a television, a mobile phone, or a tablet computer. System 100 can include a processor 102, a memory 104, a storage device 106, one or more input devices 108, and one or more output devices 110. System 100 can also optionally include an input driver 112 and an output driver 114. It is understood that system 100 may include additional components not shown in FIG. 1.

Processor 102 can include a central processing unit (CPU), a graphics processing unit (GPU), an accelerated processing unit (APU), or a multi-processor core, wherein each processor core may be a CPU, a GPU, or an APU. Memory 104 can be located on the same die as processor 102, or may be located separately from processor 102. Memory 104 can include a volatile or non-volatile memory, for example, a random access memory (RAM), a dynamic RAM, or a cache memory. Memory 104 can include at least one non persistent memory, such as dynamic random access memory (DRAM). Memory 104 can store processing logic, constant values, and variable values during execution of portions of applications or other processing logic. The term "processing logic," as used herein, refers to control flow instructions, instructions for performing computations, and instructions for associated access to resources.

Storage device 106 can include a fixed or removable storage device, for example, a hard disk drive, a solid state drive, an, optical disk, or a flash drive.

Input devices 108 can include, for example, a keyboard, a mouse, a keypad, a touch screen, a touch pad, a detector, a microphone, an accelerometer, a gyroscope, a biometric scanner, or a network connection. Output devices 110 can include, for example, a display, a speaker, a printer, an antenna, or a network connection Input driver 112 communicates with processor 102 and input devices 108, and permits processor 102 to receive input from input devices 108. Output driver 114 communicates with processor 102 and output devices 110, and permits processor 102 to send output to output devices 110. A person skilled in the relevant art will understand that input driver 112 and output driver 114 are optional components, and that system 100 may be configured without input driver 112 or output driver 114.

Figure 2:
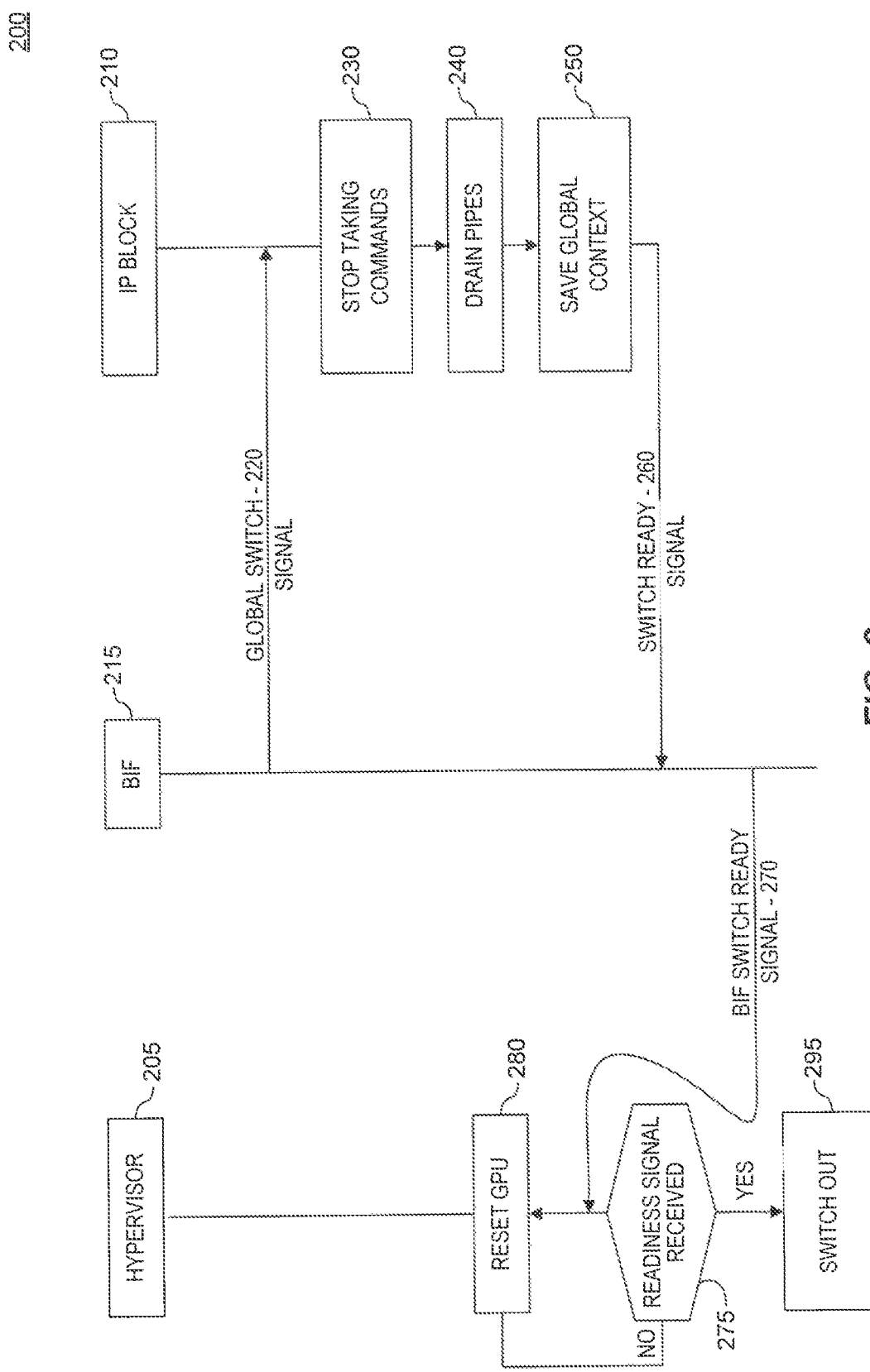
FIG. 2 is a block/flow diagram illustrating modules/steps for switching out of a function in a hardware-based virtualized system.

FIG. 2 is a block/flow diagram illustrating modules/steps for switching out of a virtual or a physical function.

Switching from one virtual machine (VM) to another VM (for example, switching from VF(0) to VF(2) or switching from PF to VF(0)) is called a global context switch or a world switch. A global context switch is the process of storing and restoring the state (context) of a processor, such as a GPU, so that execution can be resumed from the same point at a later time. This enables multiple processes to share a single processor. Since there is a one to one mapping between a VM and either a VF or PF, the operation of switching from one VM to another VM can be the equivalent in a hardware implementation of switching from one VF to another VF or from a PF to a VF. A person skilled in the relevant art will understand that each VM has its own global context and that each global context is shared on a per-application basis.

According to an embodiment, an intellectual property ("IP") block 210 (e.g., a core, arithmetic and logic unit ("ALU") and the like known to those of ordinary skill) within a processor, for example, a GI-U, may define its own global context with settings made by a base driver of its respective VM at an initialization time of the VM. These settings may be shared by all applications within a VM. Examples of GPU IP block 210 include graphics engines, GPU compute units, DMA Engines, video encoders, and video decoders.

During a global context switch, hypervisor 205 can use configuration registers (not shown) of a PF to switch a processor, for example, a GPU, from one VF to another VF or from a PF to a VF. A global switch signal 220 is propagated from a bus interface function (BIF) 215 to IP block 210. Prior to the switch, hypervisor 205 disconnects a VM from its associated VF (by un-mapping memory mapped input/output (MMIO) register space of the VF, if previously mapped) and ensures any pending activity in a system fabric has been flushed to the processor.

At operation 230, upon receipt of a global switch signal 220 from BIF 215, IP block 210 stops operation on commands (for example, system refrains from transmitting further commands to IP block 210 or IP block 210 stops retrieving or receiving commands).

At operation 240, IP block 210 drains its internal pipeline to allow commands in its internal pipeline to finish processing and the resulting output to be flushed to memory, according to an embodiment. However, IP block 210 may not be allowed to accept any new commands until reaching its idle state. In an embodiment, new commands are not accepted so that a processor does not carry any existing commands to a new VF or PF and can accept a new global context when switching into the next VF or PR At operation 250, global context of a VF or PF is saved to a memory location. After saving the global context to a memory location, IP block 210 responds to BIF 215 with switch ready signal 260 indicating that IP block 210 is ready for a global context switch. BIF 215 notifies hypervisor 205 with a BIF switch ready signal 270.

At operation 275, it is determined whether hypervisor 205 received BIF switch ready signal 270. If it is determined that hypervisor 205 received BIF switch ready signal 270, hypervisor 205 generates and sends a switch out signal 295 and the switch out process ends. If it is determined that hypervisor 205 did not receive BIF switch ready signal 270 during a predetermined time interval, hypervisor 205 resets the processor, for example, a GPU or a function, at operation 280.

Figure 3:
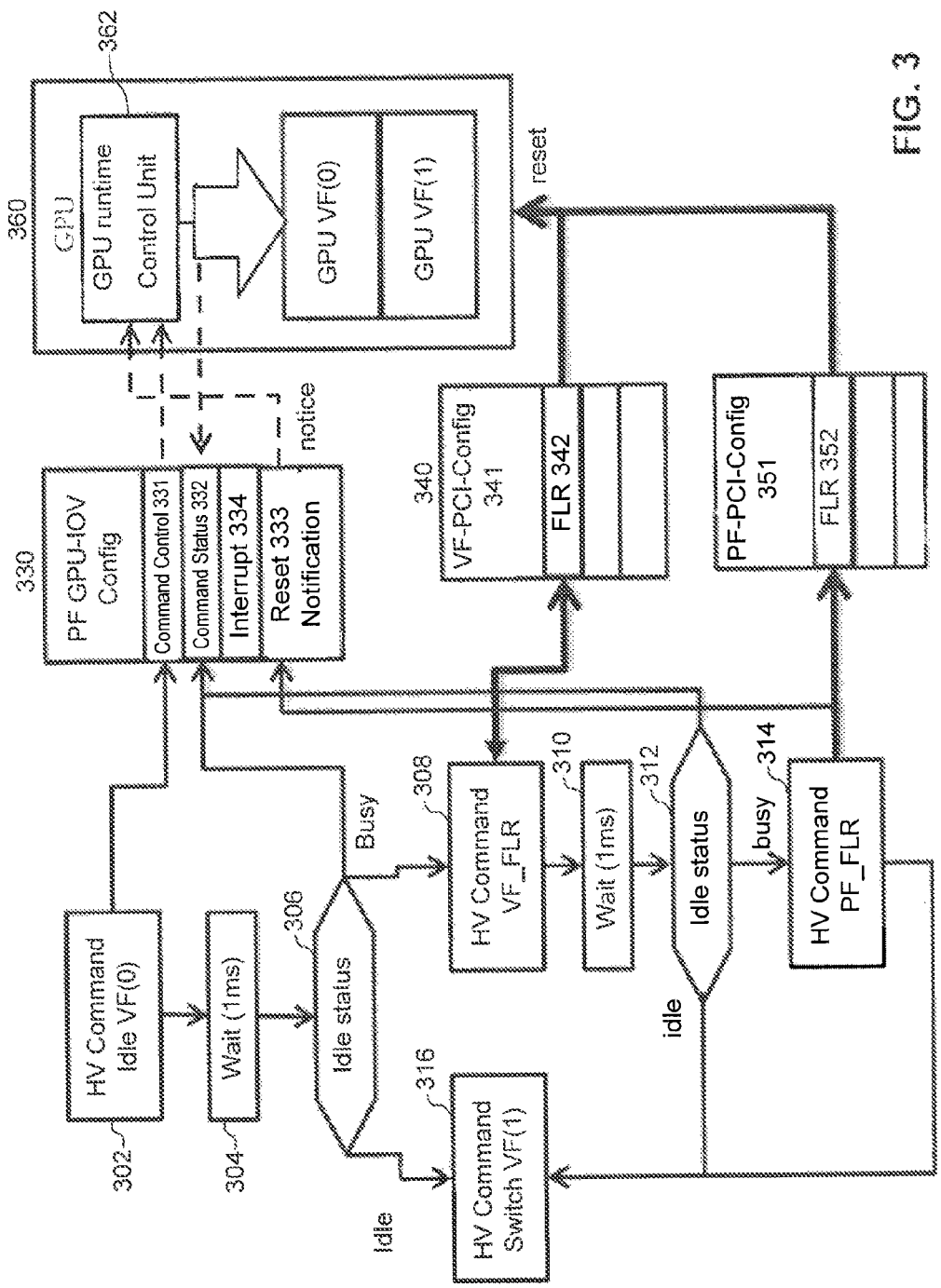
FIG. 3 is a flow diagram illustrating a reset process of a virtual function, in accordance with an embodiment.

FIG. 3 is a flow diagram illustrating a reset process of a virtual function 300, in accordance with an embodiment.

At operation 302, GPU runtime control unit 362 triggers a switch out of a VF (for example, switching out of VF(0)) by issuing an idle command to the VF. GPU runtime control unit can be a hypervisor control block, for example. According to an embodiment, the idle command is issued to the VF by writing to a register of GPU-IOV capability structure 330, for example, writing a value of one to a command control register 331.

At operation 304, GPU runtime control unit 362 waits for a predetermined time interval (for example, 1 ms) for execution of the issued idle command.

At operation 306, GPU runtime control unit 362 determines whether the issued idle command has completed execution and returned the VF (for example, VF(0)) to an idle status. In an embodiment, GPU runtime control unit 362 can determine the status of the VF by checking a register (for example, a command status register 332) of GPU-IOV capability structure 330. If it is determined that the VF has returned to an idle status, method 300 proceeds to operation 316 to continue switching out of the current VF to another VF (for example, switching out of VF(0) into VF(1)). If it is determined that the VF has not returned to an idle status, method 300 proceeds to operation 308.

At operation 308, GPU runtime control unit 362 performs a function level reset (FLR) of the VF, for example, VF_FLR of VF(0). An FLR enables the reset of the VF (i.e. VF(0)) without affecting the operation of any other functions. According to an embodiment, prior to performing a FLR of the VF, hypervisor 205 saves configuration data of the VF (for example, VF PCI configuration space 341 of VF(0)), and turns off bus mastering for the VF.

At operation 310, GPU runtime control unit 362 waits for a predetermined time interval (for example, 1 ms) for execution of the function level reset of the VF (VF_FLR) issued in operation 308.

At operation 312, GPU runtime control unit 362 determines whether VF_FLR has completed execution and returned the VF to an idle status. GPU runtime control unit 362 can determine the status of the VF by checking a register (for example, command status register 332) of GPU-IOV capability structure 330. If it is determined that the VF has returned to an idle status, the VF was successfully reset. Method 300 subsequently proceeds to operation 316 where GPU runtime control unit 362 restores the configuration data of the VF previously saved (for example, VF PCI configuration space 341) and notifies GPU 360 about the reset of the VF. This can be performed by writing a corresponding bit in a register (for example, reset notification register 333) of GPU-IOV capability structure 330. According to an embodiment, in response to writing a corresponding bit in, a register, a special interrupt/notification signal is generated and propagated. The interrupt/notification signal can be propagated to a driver of the VF, for example. The interrupt/notification signal provides an indication that a reset operation has been performed.

If it is determined that the VF has not returned to an idle status, the VF reset was not successful and the method proceeds to operation 314. At operation 314, GPU runtime control unit 362 issues a function level, reset command to the PF (for example, PF_FLR) to reset the PF and return the VF to an idle state, as described below with reference to FIG. 5. After the successful reset of the PF, method 300 proceeds to operation 316 to complete the switch out operation of the current VF to another VF, for example switching out of VF(0) into VF(1).

Figure 4:
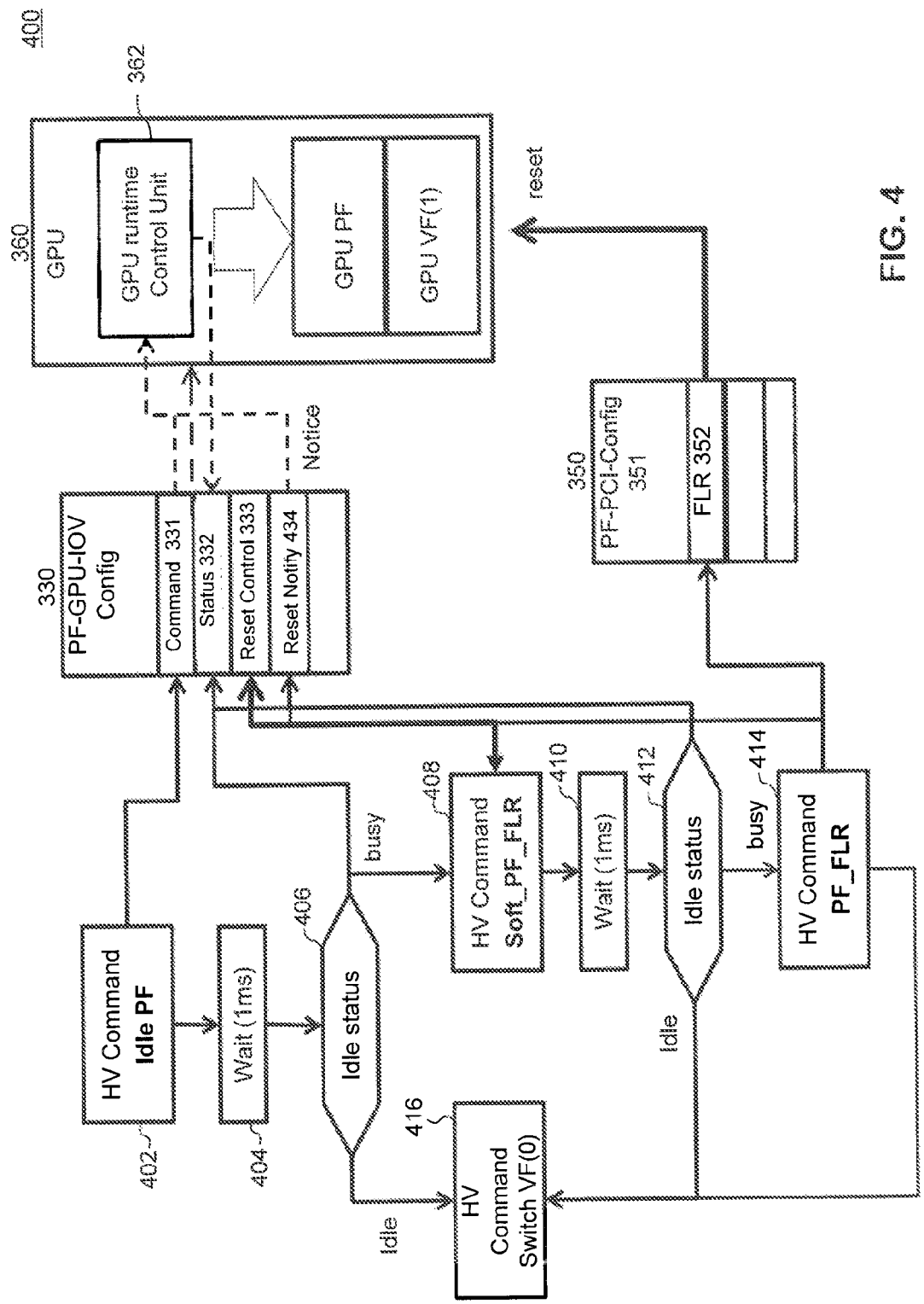
FIG. 4 is a flow diagram illustrating a reset process of a physical function, in accordance with an embodiment.

FIG. 4 is a flow diagram illustrating a reset process of a physical function 400, in accordance with an embodiment.

At operation 402, GPU runtime control unit 362 triggers a switch out of a function, for example, a PF, by issuing an idle command to the PF. The idle command is issued to the PF by writing to a register of a GPU-IOV capability structure 330, for example, writing a value of one to command control register 331.

At operation 404, GPU runtime control unit 362 waits for a predetermined time interval (for example, 1 ms) for execution of the issued idle command.

At operation 406, GPU runtime control unit 362 determines whether the issued idle command has completed execution and returned the PF to an idle status. GPU runtime control unit 362 can determine the status of the PF by checking a register (for example, command status register 332) of GPU-IOV capability structure 330. If it is determined that the PF has returned to an idle status, method 400 proceeds to operation 416 to continue switching out of the PF, for example switching out of the PF to VF(0). If it is determined that the PF has not returned to an idle status, method 400 proceeds to operation 408.

At operation 408, GPU runtime control unit 362 performs a soft function level reset of the PF (for example, SOFT_PF_FLR). In an embodiment, a SOFT_PF_FLR is a reset of only the PF without resetting any VFs associated with the PF in the virtualized system. According to an embodiment, a soft function level reset can be performed by writing to a register (for example, reset control register 434) of GPU-IOV capability structure 330. GPU runtime control unit 362 saves configuration data of the PF (for example, PF PCI configuration space 351) and turns off bus mastering for the PF prior to performing SOFT_PF_FLR, according to an embodiment.

At operation 410, GPU runtime control unit 362 waits for a predetermined time interval (for example, 1 ms) for execution of the soft reset command issued in operation 408.

At operation 412, GPU runtime control unit 362 determines whether the soft function level reset command to the PF issued in operation 408 has completed execution and returned the PF to an idle status. GPU runtime control unit 362 can determine the status of the PF by checking a register (for example, command status register 332) of GPU-IOV capability structure 330. If it is determined that the PF has returned to an idle status, the PF was successfully reset. Method 400 then proceeds to operation 416 where GPU runtime control unit 362 restores the configuration data saved above (for example, PF PCI configuration space 351), and notifies GPU 360 about the reset of the PF. This can be performed by writing a corresponding bit in a register (for example, reset notification register 333) in GPU-IOV capability structure 330. According to an embodiment, in response to writing a corresponding bit in a register, a special interrupt/notification signal is generated and propagated. The interrupt/notification signal can be propagated to a driver of the PF, for example. The interrupt/notification signal provides an indication that a reset operation has been performed.

If it determined that the PF has not returned to an idle status, the soft reset of the PF was not successful and the method proceeds to operation 414. At operation 414, GPU runtime control unit 362 issues a function level reset command to the PF (for example, PF_FLR) to reset the PF and return the PF and the associated VFs to an idle state as described below with reference to FIG. 5. After the successful reset of the PF, method 400 subsequently proceeds to operation 416 to complete the switch out of the PF to a VF.

Figure 5:
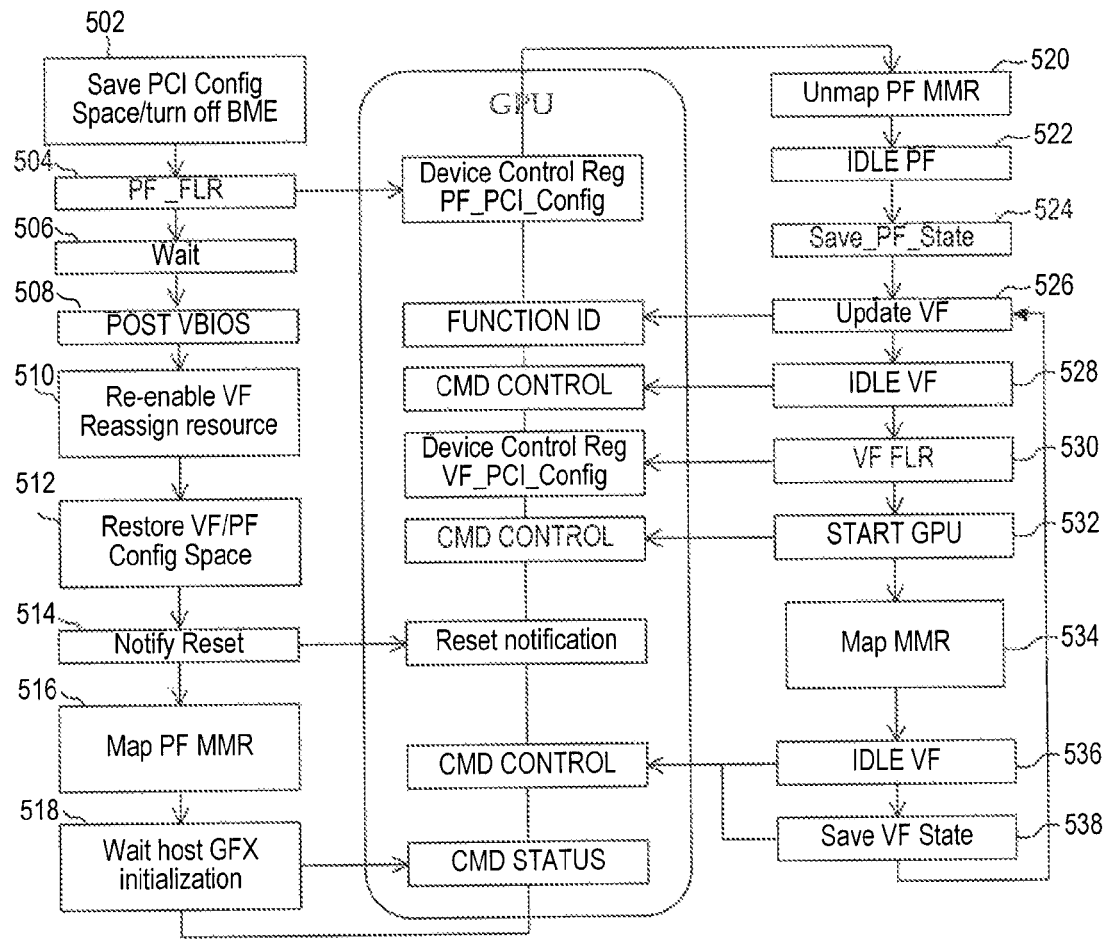
FIG. 5 is a flow diagram illustrating a reset and recovery process of a physical function, in accordance with an embodiment.

FIG. 5 is a flow diagram illustrating a reset and recovery process of a physical function 500, in accordance with an embodiment.

At operation 502, a hypervisor saves PCI configuration space of a PF and one or more VFs (for example, PCI configuration spaces 341 and 351) and turns off bus mastering. PCI configuration space is the mechanism by which the PCI Express performs auto configuration of the cards inserted into the bus. PCI devices, except host bus bridges, are generally required to provide 256 bytes of configuration registers for the configuration space. Bus mastering is a feature supported by many bus architectures that enables a device connected to the bus to initiate transactions. Turning off the bus mastering effectively disables the one or more VF's connection to the bus, according to an embodiment.

At operation 504, the hypervisor issues a function level reset command to the PF, for example, PF_FLR. A function level reset can be performed by writing to a register as described above.

At operation 506, the hypervisor waits for a predetermined time interval for execution of the issued command. The predetermined time interval can be a duration of 1 ms, for example.

At operation 508, the hypervisor starts a software virtual machine (SVM) in real mode and re-initializes the processor (for example, a GPU). The hypervisor performs this by triggering, for example, a VBIOS re-power on self-test (re-POST) call. POST refers to routines which run immediately after a device is powered on. POST includes routines to set an initial value for internal and output signals and to execute internal tests, as determined by a device manufacturer, for example.

At operation 510, the hypervisor re-enables the one or more VFs and re-assigns resources to the one or more VFs.

At operation 512, the hypervisor restores PCI configuration space of the VFs and the PF using information saved during operation 502 (for example, PCI configuration spaces 341 and 351).

At operation 514, the hypervisor notifies the VFs and the PFs about the reset (or re-initialization) of the processor (for example, a GPU). This can be performed by writing to a register (for example, by writing ones to a reset notification register of the processor) of a GPU-IOV capability structure 330.

At operation 516, the hypervisor remaps memory mapped registers (MMR) of the PF if a page fault is hit. A page fault is an exception raised by the hardware when a program accesses a page that is mapped in the virtual address space, but not loaded in physical memory.

At operation 518, the hypervisor waits for a graphics driver in the host VM to finish re-initialization to avoid any delays associated with the processor returning to a running state or any possible screen flashes.

At operation 520, the hypervisor un-maps MMR of the PF. The un-mapping of MMR of the PF is performed if the mapping was performed at operation 516.

At operation 522, the hypervisor sends a command to idle the PF as described above.

At operation 524, the hypervisor saves internal GPU running state of the PF.

At operation 526, the hypervisor sets the function ID to be switched to. For example, to switch to VF(0), the hypervisor sets VF(0) to FCN_ID in a register in GPU-IOV capability 330.

At operation 528, the hypervisor issues a command to idle the VF as described above.

At operation 530, the hypervisor issues a function level reset command to the VF (for example, VF_FLR 341 to VF(0)), to clear any uncertain status for the VF. Operation 530 is an optional step since the hypervisor issued a function level reset command to the PF at operation 504 and all VFs should be reset as well.

At operation 532, the hypervisor issues a command to the VF to start running (for example, START_GPU to VF(0)).

At operation 534, the hypervisor maps MMR of the VF which was set at operation 526, if it was un-mapped.

At operation 536, the hypervisor issues a command to idle the VF as described above.

At operation 538, the hypervisor issues a command to save a configuration state of the VF.

The hypervisor repeats operations 526-538 for each enabled VF in the virtualized system to let each guest VF restore to a proper running state.

Once the PF and the VFs are restored, the virtualized system returns to a known running/working state.

Figure 6:
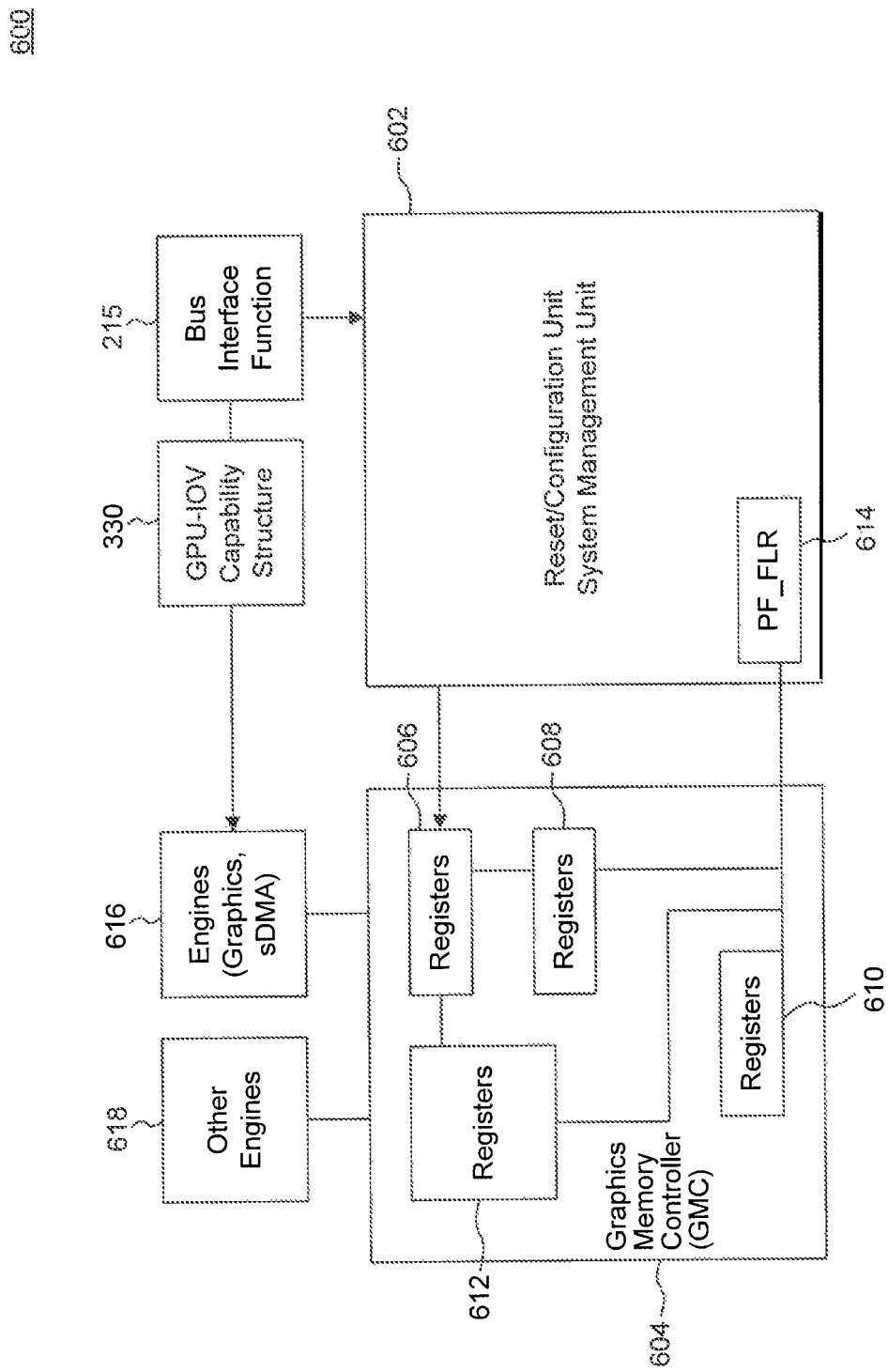
FIG. 6 is a block diagram illustrating a GPU, in accordance with an embodiment

FIG. 6 is a block diagram of an example system 600 in which one or more disclosed embodiments may be implemented.

System 600 can include a bus interface function (BIF) 215, a GPU-IOV capability structure 330, a reset/configuration unit (RCU) or a system management unit (SMU) 602, a GPU memory controller (GMC) 604, and one or more sets of engines 616 and 618. GMC 604 includes one more sets of registers 606, 608, 610, and 612.

According to an embodiment, BIF 215 communicates a reset request from hypervisor 205 (not shown in FIG. 6) to RCU/SMU 602 through a common register bus, for example, a system register bus manager (SRBM). The SRBM can be used for communication between various components of system 600 and notifies IP blocks 210 about reset of a function.

GPU-IOV capability structure 330 is a set of registers that can provide hypervisor 205 with control over allocation of frame buffers (FB) to VMs and over the state of a processor, for example, state of GPU rendering functions. In an embodiment GPU-IOV capability structure 330 can be located in a PCIe extended configuration space as described above. In another embodiment, GPU-IOV capability structure 330 can be co-located with SR-IOV capability structure in the PCIe configuration space.

In an embodiment, RCU/SMU 602 receives a reset request from BIF 215 and co-ordinates the reset by writing to a register in GMC 604. For example, RCU/SMU 602 can set a RESET_FCN_ID to a function that is being reset.

GMC 604 can include one or more sets of registers to support reset of VMs as described above. In an embodiment, GMC 604 can include one or more sets of registers 606, 608, 610, and 612. Once GMC 604 receives a write request, a register corresponding to the function that is being reset is cleared or put in a known reset state. By using the reset mechanism described above in FIGS. 3-5, only a function that receives a reset command is reset without affecting other functions.

Registers 606 can be a set of registers that are accessible by hypervisor 205 and/or RCU/SMU 602. Hypervisor 205 can use registers 606 to identify an active function, for example, a function that is currently using the rendering resources. RCU/SMU 602 can use registers 606 to identify a function that is being reset, for example, VF(0) or PF. RCU/SMU 606 can be used to trigger a reset of a VF/PF by writing to a corresponding bit vector in registers 608.

Registers 608 can be a set of registers that can store frame buffer (FB) locations of functions to assist with resetting of the identified function.

Registers 610 can be a set of registers that can store GMC 604 settings, for example, arbitration settings. In an embodiment, registers 610 are reset during reset of a PF, for example, PF_FLR 614.

Registers 612 can be a set of registers that can store VM context, for example, page table base address.

Engines 616 and 618 are examples of IP blocks 210, as described above. Engines 616 can be IP blocks 210 that process one function at a time, for example, graphics, system direct memory access (sDMA), etc. Engines 618 can be IP blocks 210 that process multiple functions at a time, for example, display, interrupt handler, etc.

In an embodiment, once hypervisor 205 issues a reset for a function, for example, as described at operation 308 of FIG. 3 for VF(0), or as described at operation 408 of FIG. 4 for the PF. The reset request is then communicated by BIF 215 to RCU/SMU 602, for example, using FCN_ID. RCU/SMU 602 sets the reset of the function by writing to a register, for example, registers 606 located in GMC 604. Once a bit vector in registers 606 is set, Engines 616 and 618 will halt any new activity related to the reset and follows the reset process described above. In an embodiment, RCU/SMU 602 can perform a hard reset by resetting registers 610 located in GMC 604.

After a function is reset as described above, hypervisor 205 communicates the reset to the driver of the function that was reset by writing to GPU-IOV capability structure 330 as described above. This communication mechanism allows the driver to recover a VM without any delay from configuration data saved earlier.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. For example, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments as contemplated, and thus are not intended to limit in any way. Various embodiments are described herein with the aid of functional building blocks for illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The breadth and scope of the present disclosure should not be limited by any of the above-described exemplary embodiments, but should be defined only in accordance with the following claims and their equivalents.

What is claimed is:

1. A method for resetting a function in a hardware-based virtualization system, comprising:
   switching out of a first function into a second function, wherein the first function is one of a physical function and a virtual function and the second function is one of a physical function and virtual function;
   detecting a malfunction in the first function during the switching; and
   resetting the first function without resetting the second function,
   wherein the switching, detecting and the resetting are performed by a hypervisor.

2. The method of claim 1, wherein the detecting comprises checking a status of a register in an input/output virtualization (IOV) capability structure of the hardware-based virtualization system.

3. The method of claim 2, wherein the IOV capability structure is a graphics processing unit (GPU) IOV capability structure.

4. The method of claim 1, wherein the first function is a first virtual function and the second function is a second virtual function.

5. The method of claim 4, wherein the resetting comprises a function level reset (FLR) of the first virtual function.

6. The method of claim 4, further comprising:
determining that the first virtual function is in a busy state after the resetting; and
resetting a physical function associated with the first virtual function in response to the determining,
wherein the determining and the resetting are performed by the hypervisor.

7. The method of claim 4, further comprising:
determining that the first virtual function is in an idle state after the resetting;
restoring configuration data of the first virtual function; and
notifying a driver of the first virtual function about the resetting,
wherein the restoring and the notifying are performed by the hypervisor in response to the determining.

8. The method of claim 7, wherein the notifying comprises:
performing a write operation to a reset notification register;
generating an interrupt signal in response to the write operation; and
propagating the interrupt signal to the driver of the first virtual function.

9. The method of claim 1, wherein the first function is a first physical function and the second function is a virtual function associated with the first physical function.

10. The method of claim 9, wherein the resetting comprises a soft function level resetting (FLR) of the first physical function without resetting the associated virtual function or any additional any virtual functions associated with the physical function.

11. The method of claim 9, further comprising:
determining that the first physical function is in a busy state after the resetting; and
resetting the first physical function associated with the virtual function,
wherein the detecting and the resetting are performed by the hypervisor.

12. The method of claim 10, further comprising:
enabling and assigning resources to the associated virtual function;
restoring the configuration data of the first physical function and the associated virtual function;
initializing a software virtual machine (SVM);
initializing a processor; and
notifying the physical function and the virtual function about the resetting.

13. The method of claim 1, wherein resetting the first function without resetting the second function comprises:
issuing an idle command to the first function;
waiting for a predetermined time interval for execution of the issued idle command;
determining whether the issued idle command has completed execution and returned the first function to an idle status; and
if it is determined that the first function has returned to an idle status, continue switching out of the first function to the second function.

14. The method of claim 13 further comprising:
if the first function has not returned to an idle status, performing one of a function level reset, a soft level reset and a hard reset of the first function.

15. The method of claim 13 wherein the resetting comprises:
generating a write request to a register corresponding to the first function; and
setting the register to a known reset state based on the write request.

16. A hardware-based virtualization system to reset a function, comprising:
one or more processors; and
a memory, the memory storing instructions that, when executed by the one or more processors, cause the one or more processors to:
switch out of a first function into a second function, wherein the first function is one of a physical function and a virtual function and the second function is one of a physical function and virtual function;
detect a malfunction in the first function during the switch; and
reset the first function without resetting the second function.

17. The system of claim 16, wherein the first function is a first virtual function and the second function is a second virtual function.

18. The method of claim 17, wherein the reset comprises a function level reset (FLR) of the first virtual function.

19. The system of claim 17, wherein the hypervisor is further configured to:
determine that the first virtual function is in a busy state after the reset; and
reset a physical function associated with the first virtual function when the first virtual function is determined to be in a busy state.

20. The system of claim 16, wherein the first function is a first physical function and the second function is a virtual function associated with the physical function.

21. A non-transitory computer readable storage device having computer program logic recorded thereon, execution of which, by a computing device, causes the computing device to perform operations, comprising:
switching out of a first function into a second function, wherein the first function is one of a physical function and a virtual function and the second function is one of a physical function and virtual function; detecting a malfunction in the first function during the switching; and
resetting the first function without resetting the second function,
wherein the switching, detecting and the resetting are performed by a hypervisor.

22. The computer readable storage device of claim 21, wherein the first function is a first virtual function and the second function is a second virtual function.

23. The computer readable storage device of claim 21, wherein the first function is a first physical function and the second function is a virtual function associated with the first physical function.

* * * * *